(12) United States Patent
Smaak et al.

(10) Patent No.: US 9,083,542 B2
(45) Date of Patent: Jul. 14, 2015

(54) METHOD FOR USING A COMPUTER NETWORK

(75) Inventors: Marc Smaak, Bergen op Zoom (NL); Stephan van Tienen, Bergen op Zoom (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/148,481

(22) PCT Filed: Feb. 9, 2009

(86) PCT No.: PCT/EP2009/051426
§ 371 (c)(1),
(2), (4) Date: Nov. 10, 2011

(87) PCT Pub. No.: WO2010/088965
PCT Pub. Date: Aug. 12, 2010

(65) Prior Publication Data
US 2012/0047405 A1 Feb. 23, 2012

(51) Int. Cl.
| | |
|---|---|
| *G06F 15/16* | (2006.01) |
| *H04L 12/18* | (2006.01) |
| *H04L 12/751* | (2013.01) |
| *H04L 12/759* | (2013.01) |
| *H04L 12/761* | (2013.01) |
| *H04L 12/707* | (2013.01) |
| *H04L 12/703* | (2013.01) |
| *H04L 12/753* | (2013.01) |
| *H04L 29/14* | (2006.01) |

(52) U.S. Cl.
CPC ............ *H04L 12/1868* (2013.01); *H04L 45/02* (2013.01); *H04L 45/028* (2013.01); *H04L 45/16* (2013.01); *H04L 45/22* (2013.01); *H04L 45/28* (2013.01); *H04L 45/48* (2013.01); *H04L 69/40* (2013.01)

(58) Field of Classification Search
CPC .......... H04L 12/28; H04L 12/56; G06F 11/07
USPC ............................ 709/223, 238, 240, 245, 242
See application file for complete search history.

(56) References Cited

U.S. PATENT DOCUMENTS

| | | | |
|---|---|---|---|
| 5,898,686 A | 4/1999 | Virgile | |
| 7,274,869 B1 * | 9/2007 | Pan | ..................................... 398/5 |
| 7,821,920 B2 * | 10/2010 | Yoo | ................................ 370/216 |
| 8,175,078 B2 * | 5/2012 | Voit et al. | ....................... 370/351 |

(Continued)

FOREIGN PATENT DOCUMENTS

| | | |
|---|---|---|
| EP | 1983713 A1 | 10/2008 |
| WO | 9848343 | 10/1998 |

OTHER PUBLICATIONS

PCT/EP2009/051426 International Search Report.

(Continued)

*Primary Examiner* — Chandrahas Patel
*Assistant Examiner* — Lan Huong Truong
(74) *Attorney, Agent, or Firm* — Michael Best & Friedrich LLP

(57) ABSTRACT

The invention provides for a method for using a computer network (10) comprising a number of switches (18, 20) each having ports for receiving and sending streams, wherein the streams are sent from a router (14) via the ports of switches (18, 20), that have shown interest, to at least one receiver (24, 26), whereby in case of a link failure at least one of the at least one receiver (24, 26) sends back a message to the router.

9 Claims, 4 Drawing Sheets

(56) References Cited

U.S. PATENT DOCUMENTS

| | | | |
|---|---|---|---|
| 8,218,432 B2 * | 7/2012 | Le Roux et al. | 370/221 |
| 2002/0013162 A1 | 1/2002 | Whitney | |
| 2004/0158872 A1 * | 8/2004 | Kobayashi | 725/120 |
| 2006/0209787 A1 * | 9/2006 | Okuda | 370/351 |
| 2007/0101379 A1 * | 5/2007 | Pereira | 725/90 |
| 2008/0181241 A1 | 7/2008 | Regan et al. | |
| 2009/0109859 A1 * | 4/2009 | Rahman et al. | 370/242 |
| 2009/0252033 A1 * | 10/2009 | Ramakrishnan et al. | 370/228 |
| 2009/0323517 A1 * | 12/2009 | Elam et al. | 370/218 |
| 2010/0150160 A1 * | 6/2010 | Kinsky et al. | 370/395.53 |

OTHER PUBLICATIONS

Christensen, M. et al., "IGMP and MLD snooping switches <draft-ietf-magma-snoop-00.txt>" Magma Working Group, Internet Draft, Internet Engineering Task Force, pp. 1-18, Oct. 1, 2001.

\* cited by examiner

METHOD FOR USING A COMPUTER NETWORK

TECHNICAL FIELD

The invention provides for a method for using a computer network, such a computer network and a computer program for carrying out the method.

BACKGROUND ART

Ethernet networks are frame-based computer networks for local area networks. In order to more efficiently use the available bandwidth in a switched Ethernet network with multicast data streams the so called IGMP (Internet Group Management Protocol) snooping mechanism exists.

The Internet Group Management Protocol (IGMP) is a communication protocol used to manage the membership of Internet Protocol multicast groups. Therefore, IGMP is used by IP hosts and adjacent multicast routers to establish multicast memberships. IGMP snooping is the process of listening to IGMP traffic and allows the switch to listen in IGMP conversation between hosts and routers by processing the layer 3 IGMP packets sent in a multicast network.

In a switched Ethernet network without IGMP snooping all multicast traffic is broadcasted to any port of the Ethernet switch. This means that there is no difference between a real broadcast and multicast traffic at the switched network. Therefore, the multicast behaviour is only present at the routed level of the network. By use of IGMP snooping the switch will only send the multicast stream to switch-ports that have shown interest in the multicast stream. At other switch-ports no bandwidth is used for the multicast stream. However, an IGMP querier is required for this mechanism to function. Usually, the IGMP querier is implemented in the Ethernet router. But this could also be the (root)switch. In a network comprising many multicast streams IGMP snooping is inevitable.

There are solutions for a switched Ethernet network to create a redundant network path. This can be handled by standardized protocols like Spanning Tree Protocol (STP IEEE 802.1d) and Rapid Spanning Tree Protocol (RSTP IEEE 802.1w). Since an Ethernet network does not allow for loops these protocols find the loop in the network and interrupt it automatically. In case that the communication path is interrupted somewhere else (e.g. cable failure) this failure is detected and the place where the loop was broken on purpose is repaired.

If IGMP snooping is combined with (R)STP a problem occurs when one of the communications is interrupted. That is because the multicast stream is not present at the alternative link and therefore, it can not be distributed downwards the network. At regular intervals the IGMP querier sends out a multicast message to all hosts in the network if they do (still) require a multicast stream. When this message arrives at the host, via the backup path, the host will respond. From that moment onwards the host will receive the multicast stream.

As the IGMP querier interval is 125 s in Commercial Of The Shelve (COTS) equipment the host can be without the multicast stream for maximal 125 s. In many applications this is far to long

DISCLOSURE OF THE INVENTION

According to a method for using a computer network comprising a number of switches each having ports for receiving and sending streams, wherein the streams are sent from a router via the ports of switches, that have shown interest, to at least one receiver, whereby in case of a link failure at least one receiver of the at least one receiver will send back a message to the router.

According to an embodiment, in case of a link failure the receiver or an application running on the receiver noticing the failure will send a message back to the router defining a path for streams from the router to the at least one receiver.

In one embodiment, in case of a link failure the switches in the network will broadcast STP or RSTP messages to trigger all receivers to automatically send out a message.

According to one embodiment, the computer network is a redundant Ethernet network, e.g. handled by a standardized protocol like Spanning Tree Protocol (STP) or Rapid Spanning Tree Protocol (RSTP).

A Computer network comprising a router and an number of switches each having ports for receiving and sending messages and being connected to at least one receiver, is adapted for sending messages from the router via the ports of switches, that have shown interest, to the at least one receiver, whereby in case of a link failure at least one of the at least one receiver will send back a message to the router.

In one embodiment, the receiver or an application running on the receiver noticing the failure will send a message back to the router defining a path for messages from the router to the at least one receiver.

According to another embodiment, the switches in the network will broadcast STP or RSTP messages in order to establish a new spanning tree. If the device acting as querier issues an extra query, in case it detects such messages, all multicast receivers will automatically send out a message.

According to one embodiment, the computer network is a redundant Ethernet network.

An Internet Group Management Protocol (IGMP) can be used. Furthermore, an IGMP snooping combined with (R)STP can be used.

A Computer program comprises coding means, for carrying out all the steps of a process described before, wherein the computer program is run on a computer or a corresponding computing unit.

A Computer program comprises program coding means which are stored on a computer readable data carrier, for carrying out all the steps of a process described before, wherein the computer program is run on a computer or a corresponding computing unit.

By using the invention, the loss of the stream is limited to a very short period of time. The actual period depends on the package reception rate of the multicast stream. For a low latency audio stream it could be <0.1 s. This can be realized by merely changing the application that has to receive multicast streams. Switches and routers do not need to be changed and can absolutely stay according the standards. This is advantageous as COTS switches and routers can be used by the application. For example, the invention can be used in IP based audio systems.

Figure 1:
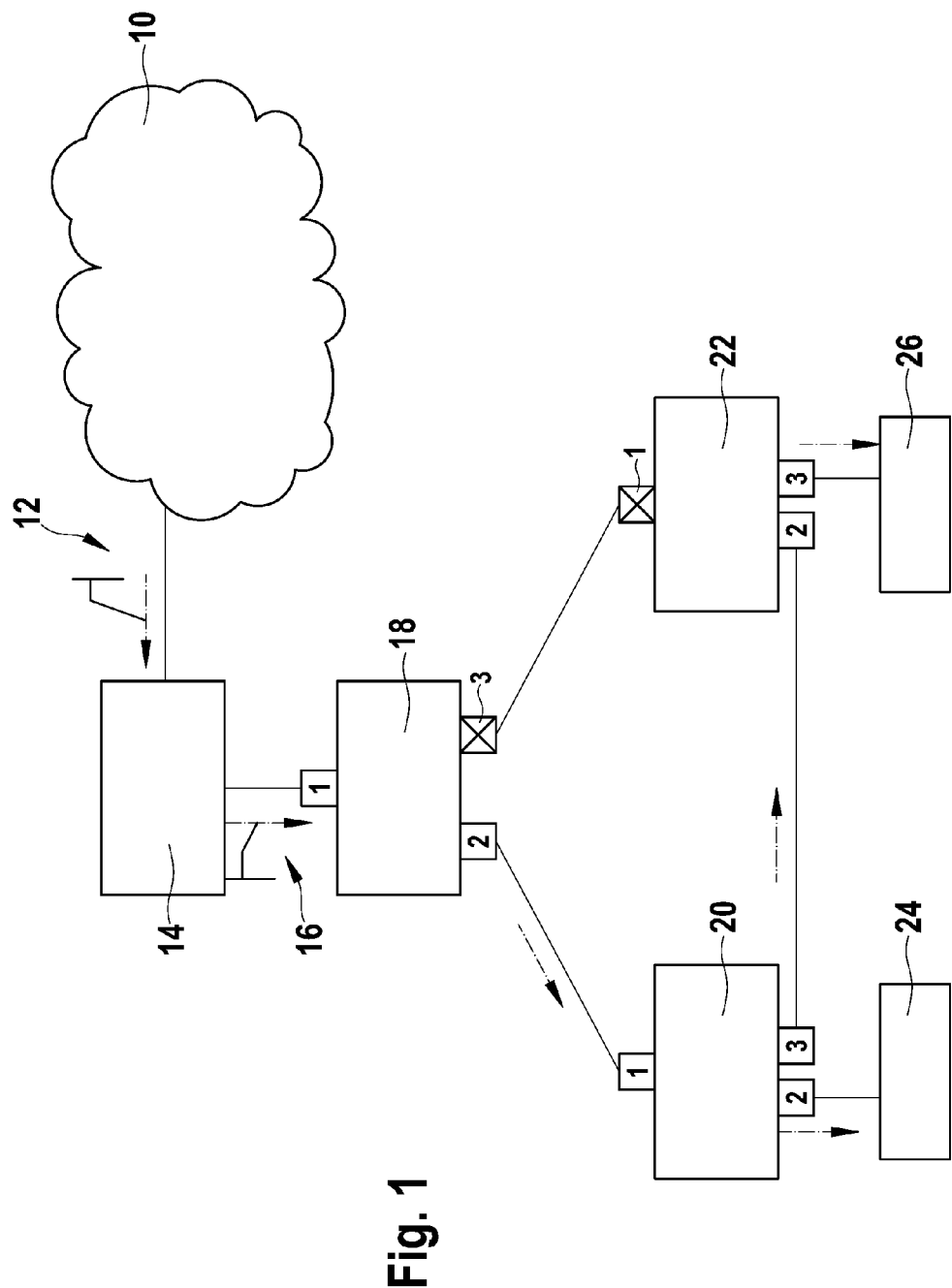
FIG. 1 is a redundant Ethernet network without failure.

It will be understood that the features mentioned above and those described hereinafter can be used not only in the combination specified but also in other combinations or on their own, without departing from the scope of the present invention.

The invention is diagrammatically illustrated in the drawings by means of embodiments by way of example, and is hereinafter explained in detail with reference to the drawings. It is understood that the description is in no way limiting on the scope of the present invention and is nearly an illustration of embodiments of the invention.

DESCRIPTION OF EMBODIMENTS

FIG. 1 shows data streams in an Ethernet network without failure. Numeral 10 indicates other (switched) networks. At the start of a multicast stream X the TCP-IP protocol stack will send the IGMP request message in step 12 to the router 14 comprising the IGMP querier. In step 16 the router 14 will respond in sending the multicast stream. Since the switched network has snooped the IGMP message it knows where to send it. Numeral 18 indicates Switch A with IGMP snooping and RSTP. Numeral 20 indicates Switch B with IGMP snooping and RSTP. Numeral 22 indicates Switch C with IGMP snooping and RSTP. Numerals 24 indicates a multicast receiver 1 and numeral 26 indicates a multicast receiver 2. The multicast stream will be sent to Switch A 18 port 2 to Switch B 20 port 2 & 3 to Switch C 22 port 3.

Figure 2:
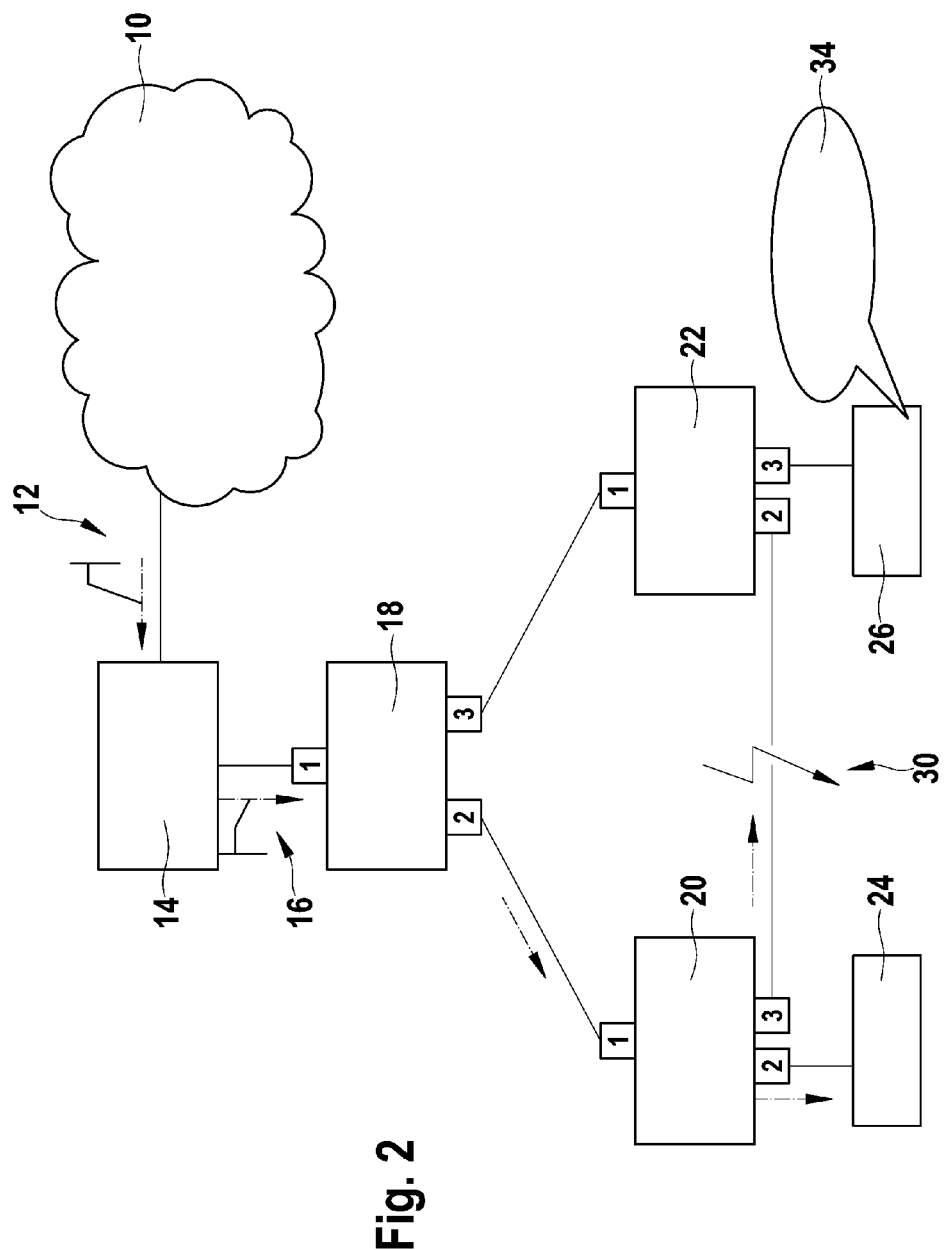
FIG. 2 is a redundant Ethernet network immediately after a link failure.

FIG. 2 shows data streams in case that the network connection is interrupted (numeral 30) between Switch B 20 and Switch C 22. (R)STP will restore the connection to Switch C 22 via port 3 of Switch A 18 and port 1 of Switch C 22. However, the multicast stream is not available at this port. Therefore, multicast receiver 2 (numeral 26) will not receive stream X, that means that receiver 2 (numeral 26) misses stream X as indicated by numeral 34. This is not detected by the TCP-IP stack since the TCP-IP stack does not know anything about transmission rate of the stream and does not know when to expect the next packet of stream X. Therefore, it will wait for the IGMP querier message until it sends out an IGMP message. This can take up to 125 s. In that case receiver 2 (numeral 26) again receives stream X as indicated by numeral 36 in FIG. 3.

Figure 4:
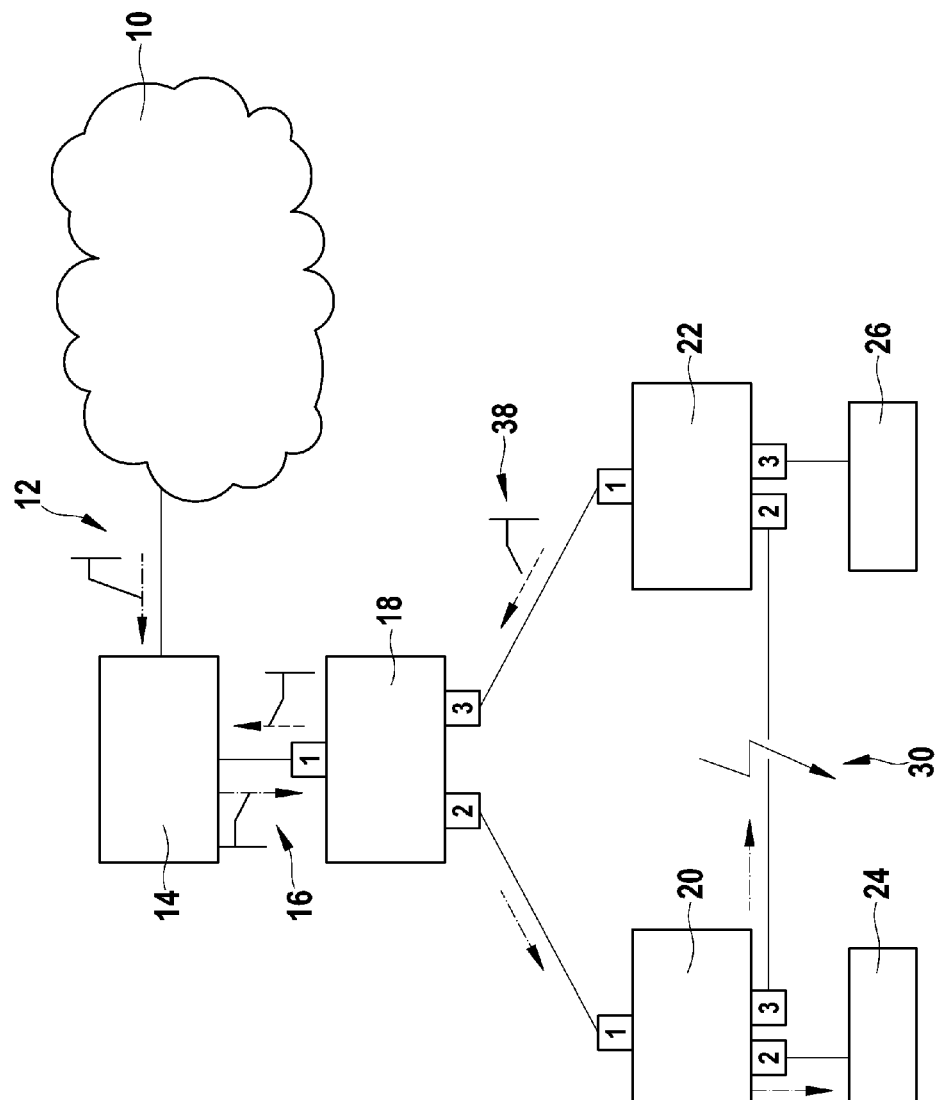
FIG. 4 is a path of the IGMP message.

However, the application running on receiver 2 (numeral 26) and receiving the stream does have this information. It will notice that the stream suddenly stops. If the application would issue a new request for the stream to the TCP-IP stack it will send out an IGMP message to the router. This message will follow the next network path as shown in FIG. 4. The router 14 does nothing as it has already sent stream X. Nevertheless, Switch A 18 has snooped the IGMP message and starts sending stream X also on port 3 (step 38). Switch C 22 receiving the message at port 1 did snoop the IGMP message and therefore knows that it has to send message only to port 3. The application is again receiving stream X. This takes as long as it took oroginally to subscribe to the stream, usually less than 100 ms.

Figure 3:
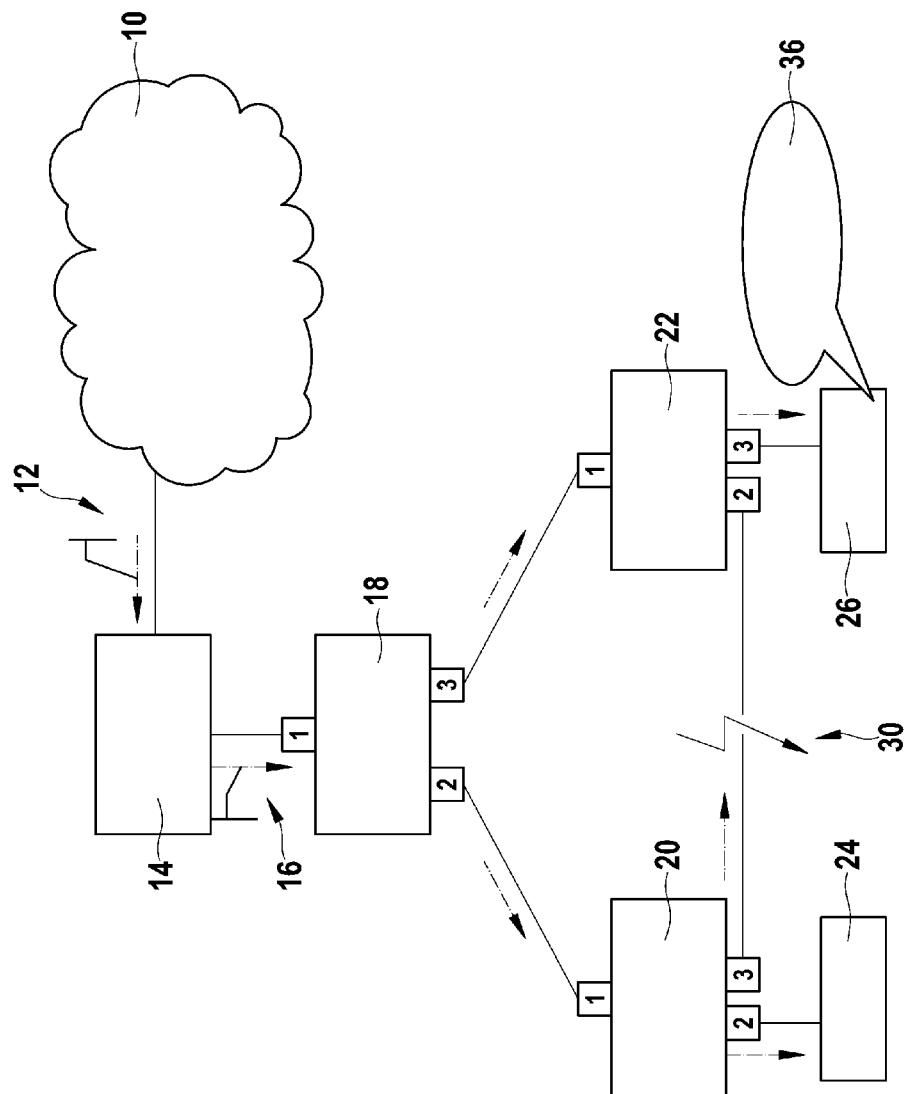
FIG. 3 is a redundant Ethernet network 125 seconds after a link failure.

According to an alternative embodiment, when a broken link is detected the switches in the network will broadcast STP or RSTP messages in order to establish a new spanning tree. If the device acting as IGMP querier issues an extra query, in case it detects such messages, all multicast receivers will automatically send out an IGMP message and the multicast routes to the receivers are also re-established. In this way, the situation shown in FIG. 3 is quickly repaired after the link is broken.

This solution ensures that the root of the multicast routing tree acts upon a spanning tree change, whereas the solution described before ensures that the leaf of the multicast routing tree acts upon a spanning tree change or leaves in case of multiple affected receivers.

The invention claimed is:

1. A method for using a computer network (10) comprising a number of switches (18, 20) each having ports for receiving and sending streams, wherein the streams are sent from a router (14) via the ports of switches (18, 20) to at least one receiver (24, 26), whereby in case of a link failure where an application running on a receiver (24, 26) detects the streams have suddenly stopped, the receiver (24, 26) sends back a message to the router (14) by a network path different than the network path having the link failure; wherein the receiver (24, 26) detecting the failure sends an Internet Group Management Protocol (IGMP) message back to the router (14) defining a new path for the streams from the router (14) to the receiver (24, 26); and wherein the receiver (24, 26) begins to receive the streams again in less than 100 milliseconds.

2. The method according to claim 1, wherein in case of a link failure the switches (18, 20) in the network (10) will broadcast STP or RSTP messages to trigger all receivers (24, 26) to automatically send out a message.

3. The method according to claim 1, wherein the network (10) is a redundant Ethernet network.

4. A computer network comprising a router (14) and a number of switches (18, 20) each having ports for receiving and sending messages and being connected to at least one receiver (24, 26), wherein the computer network (10) is adapted for sending messages from the router (14) via the ports of switches (18, 20) to the at least one receiver (24, 26), whereby in case of a link failure where an application running on a receiver (24, 26) detects the streams have suddenly stopped, the receiver (24, 26) sends back an Internet Group Management Protocol (IGMP) message to the router (14) defining a new path for the streams from the router (14) to the receiver (24, 26) by a network path different than the network path having the link failure; and wherein the receiver (24, 26) begins to receive the streams again in less than 100 milliseconds.

5. The computer network according to claim 4, wherein the computer network (10) is a redundant Ethernet network.

6. The computer network according to claim 4, wherein the Internet Group Management Protocol (IGMP) is used.

7. The computer program with coding means incorporated on a non-transitory computer readable medium, for carrying out all the steps of a process according to claim 1, wherein the computer program is run on a computer or a corresponding computing unit.

8. A computer program with program coding means which are stored on a non-transitory computer readable data carrier, for carrying out all the steps of a process according to claim 1, wherein the computer program is run on a computer or a corresponding computing unit.

9. The method according to claim 1, wherein the Internet Group Protocol (IGMP) is used, and IGMP messages are snooped by switches (18, 20, 22).

* * * * *